May 25, 1937.    W. E. SWENSON    2,081,157
CRANKSHAFT LUBRICATION SYSTEM
Filed Feb. 7, 1936    2 Sheets-Sheet 1
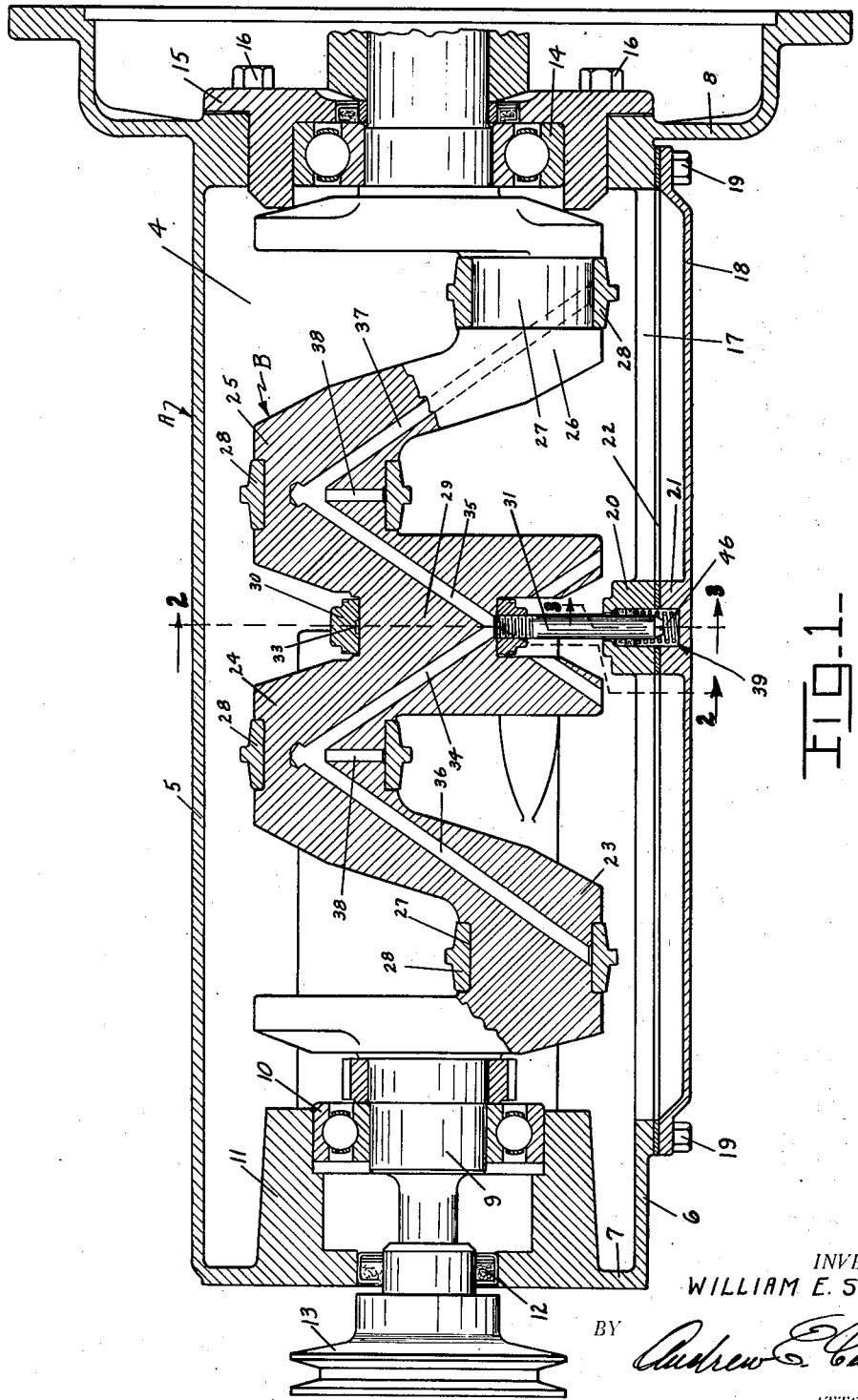
INVENTOR.
WILLIAM E. SWENSON
BY
ATTORNEY.

May 25, 1937. W. E. SWENSON 2,081,157
CRANKSHAFT LUBRICATION SYSTEM
Filed Feb. 7, 1936 2 Sheets-Sheet 2
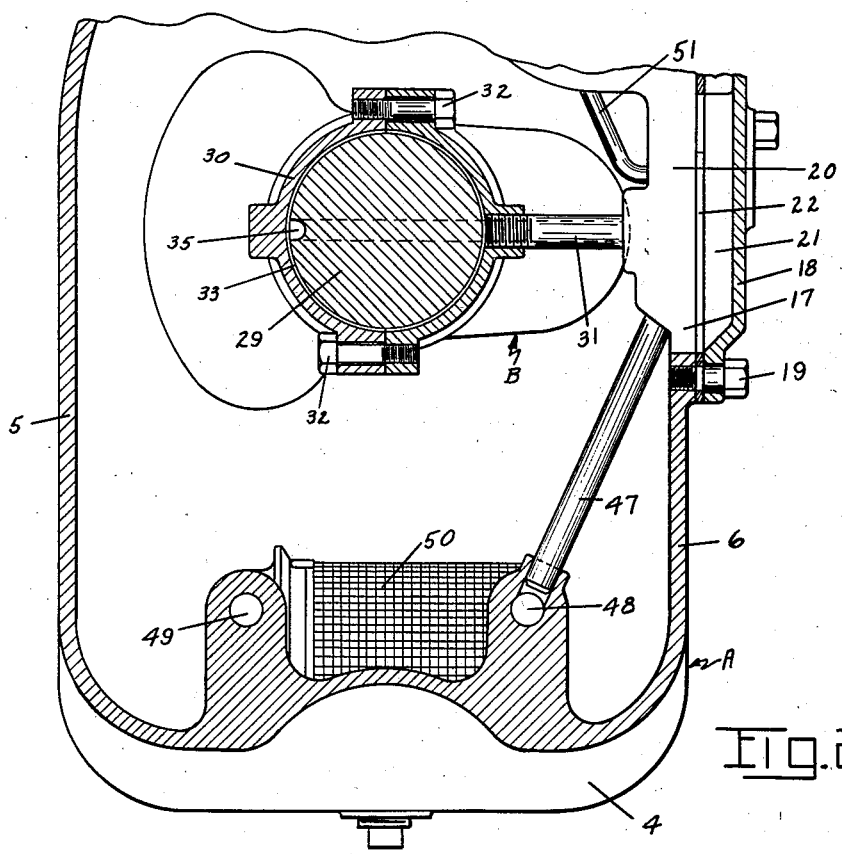
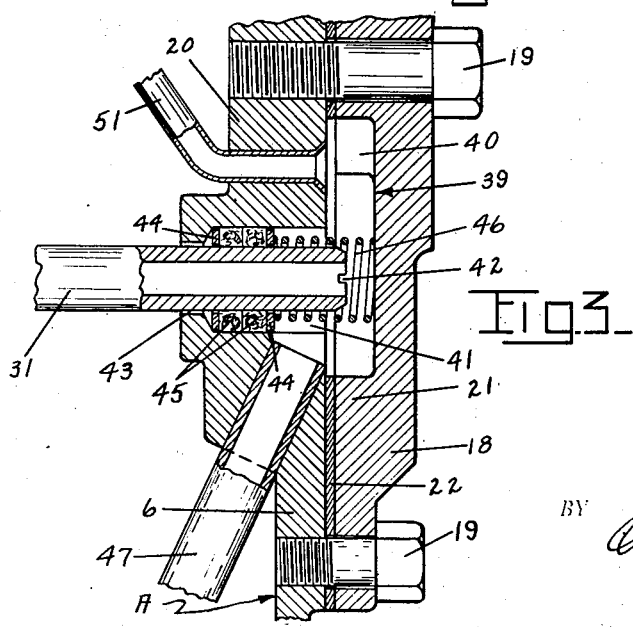
INVENTOR.
WILLIAM E. SWENSON
BY
ATTORNEY.

Patented May 25, 1937

2,081,157

UNITED STATES PATENT OFFICE 2,081,157

CRANKSHAFT LUBRICATION SYSTEM

William E. Swenson, St. Paul, Minn., assignor to Minneapolis-Moline Power Implement Company, Minneapolis, Minn., a corporation of Delaware Application February 7, 1936, Serial No. 62,850

11 Claims. (Cl. 184—6)

This invention relates to means and methods for lubricating the connecting rod bearings of crankshafts, such as used in internal combustion engines, and the main object is to provide a novel, efficient, and practical force feed lubrication system that will insure the proper lubrication of the bearing surfaces in question while the engine is running and without depending on the so-called splash feed method of oiling. The system is particularly, though not exclusively, designed and intended for use in connection with an engine of the type illustrated in my copending application Ser. No. 62,849, filed February 7th, 1936, for Power plant, to which application attention is directed for a more comprehensive understanding of the engine structure generally.

In the accompanying drawings, which illustrate a preferred embodiment of the invention:

Fig. 1 is a horizontal cross sectional view through the crank case of an engine having a crank and lubricating apparatus embodying my invention, portions of the crank, connecting rods, and apparatus also being shown in section.

Fig. 2 is a slightly enlarged sectional elevation on line 2—2 in Fig. 1.

Fig. 3 is an enlarged sectional detail elevation on line 3—3 in Fig. 1.

Referring to the drawings more particularly and by reference characters, A designates generally the engine case or housing in which is journaled, and operates, the crank shaft B. The housing A includes bottom section 4, side walls 5 and 6, front end wall 7, and rear end wall 8, all, in the present instance, integrally cast together. The forward end of the crank shaft B has a bearing portion 9 rotatably supported by bearing ring 10 in an inwardly projecting hub 11 of the front wall 7; and extends beyond the bearing ring and through a packing ring 12 to support and drive a fan belt pulley 13.

At its rear the crank shaft is journaled by a bearing ring or cage 14 supported in an annular collar 15 which projects through and is secured to the rear wall 8, by bolts 16. The aperture in wall 8 which internally receives the collar 15 is of such size that when the collar 15 is detached and removed the crank shaft may be withdrawn from and inserted into the housing A endwise through the aperture, as more particularly set forth in my aforementioned application. The crank case and oil pan being integrally connected, access to the interior for attaching connecting rods and other purposes, is had through a lateral opening 17, in wall 6, and this opening is normally closed by a cover plate 18, detachably secured by stud bolts 19. The opening 17 is traversed, however, by a vertical post or bar 20, which is integral with the side wall 6, centrally between the ends of the opening, and this post is complemented by an inward, integral projection 21 of the cover plate 18, which is sealed with respect thereto by a section of the cover gasket 22.

The crank shaft B, in the present instance, is of the two-bearing type, and is shown as being provided intermediate its ends with four cranks 23, 24, 25, and 26, each of which is provided with a gudgeon or machined bearing section 27 for operating engagement in the lower end of one of the connecting rods 28 (Fig. 1) of the power pistons. Intermediate the cranks 24 and 25 the crank shaft is provided with a hub portion 29, which is in axial alignment with the axis of rotation, and upon this hub is mounted a ring 30 which is held against rotation by a pipe 31, but permits the hub to rotate within itself.

The ring 30 is sectionally formed, as shown in Fig. 2, to permit securing it upon the hub, and the two sections are rigidly connected by bolts 32. The inner or hub engaging surface of the ring is provided with a central annular groove 33 which is in communication with the interior of pipe 31 and also with the converging and connected ends of two ducts 34 and 35 drilled in the crank shaft and extending, respectively, into cranks 24 and 25. The ducts 34 and 35 connect, respectively, with ducts 36 and 37 which continue the lubricant passageways into cranks 23 and 26. As shown, the ducts 36 and 37 open directly to the bearing surfaces of the endmost crankshaft gudgeons, but the bearing surfaces of the inner cranks preferably communicate with and receive lubricant fluid from the passages through supplemental lateral passages 38. It will thus be seen that when oil is supplied to the pipe 31 under pressure it will pass through the various passages 31, 33, 34—35, 38, and 36—37 to the several connecting rod bearing surfaces and maintain them in proper lubricated condition.

The outer end of the pipe 31 extends into a chamber 39, formed in part by a recess 40 in the plate portion 21 and in part by a cylindrical aperture 41 in the housing post 20, so that the pipe is in open communication with the chamber to receive oil under pressure therefrom. It may be noted that the outer end of the pipe is provided with a cross slot 42 for engagement by a screw driver, when cover plate 18 is removed, to facilitate screwing the pipe into ring 30 during the assembling operation. It will also be noted that the pipe 31 does not have a tight fit in the post 20, but passes through a hole 43 which is slightly larger than its external diameter, with a result that neither the pipe nor the ring 30 are rigid with respect to the crank case but may move slightly both vertically and transversely with respect to it. This constitutes an important feature of the invention inasmuch as it permits self centering of the ring 30 on the shaft hub 29, and consequently insures proper lubricating engagement and operation of the ring, and without any possible binding action or strains which might result in breakage of parts and consequent oiling failure should the hub be or become slightly eccentric with respect to the axis of crank shaft rotation.

To prevent the escape of lubricant liquid through the opening 43, which, as stated, is somewhat larger than the pipe 31, I provide the aperture 41 with a pair of washers 44 and intermediate packing rings 45 which surround the pipe 31 and effectively seal the annular opening 43 against leakage. This seal is maintained under the action of a spring 46 which is held in compressed condition between the sealing unit and the cover plate 18.

The lubricating oil is supplied to the chamber 39 under pressure, from a suitable source of supply and through a suitable pumping unit. In the present instance a pipe 47 connects the chamber 39 to a conduit 48 in the housing base. This conduit is fed from a pump (not shown) which draws its supply from a parallel conduit 49 connected with a strainer 50 disposed in the oil supply stored in the crank case base, all as more particularly set forth in my copending application Serial No. 63,469, for Oil pump and magneto drive assembly, filed February 11th, 1936. It may also be noted that the chamber 39 may be used as a common distribution point for other oil conducting tubes, such as 51, leading to other parts of the machine.

From the foregoing description read in conjunction with the accompanying drawings, the operation and advantages of the invention will be readily understood. It is understood, however, that the disclosure is illustrative only and that various modifications are permissible if within the spirit and scope of the appended claims.

Having now therefore illustrated and described the invention, what I claim to be new and desire to protect by Letters Patent is:

1. The combination with a crank shaft having a hub portion concentric with the axis of rotation and having oil ducts extending from the peripheral surface of the hub portion to bearing surfaces of the several cranks, of a member encircling the hub and having an annular groove in its inner peripheral surface in communication with said oil ducts, means for supplying oil under pressure to the member groove, and yieldable means connected to the member to prevent rotation thereof with the crank shaft while permitting a floating action thereof in response to eccentric fluctuations in the rotation of the hub portion.

2. A rotatable, journaled shaft having an annular bearing surface, a ring encircling the shaft and supported thereby at a point spaced from said surface, a lubricant duct extending through the shaft with an outlet end open to the bearing surface and its inlet end open to the surface adjacent the inner peripheral surface of the ring, means for restraining the ring from rotating with the shaft while permitting a floating action of the ring in response to eccentric fluctuations of the shaft, said inner ring surface having a lubricant supplied annular groove maintained in constant open communication with the inlet end of said duct to supply lubricant thereto for passage through the duct to said bearing surface.

3. A rotatable, journaled shaft having an annular bearing surface, a ring encircling the shaft and supported thereby at a point spaced from said surface, a lubricant duct extending through the shaft with an outlet end open to the bearing surface and its inlet end open to the surface adjacent the inner peripheral surface of the ring, said inner ring surface having an annular groove in open communication with the duct inlet, and a pipe connected with the ring for supplying the groove thereof with lubricant under pressure and for restraining the ring from rotary movement with the shaft while permitting eccentric fluctuations of the ring with respect to the axis of shaft rotation.

4. The combination with a crank shaft of an engine having connecting rods trunnioned to the cranks of the shaft, of a ring shaped member encircling the shaft and carried thereby with freedom for floating self-adjustment thereon but restrained from rotation therewith, said member having a groove in its inner surface and means for supplying the groove with lubricant under pressure, said shaft being provided with passageways in communication with said groove so as to receive lubricant therefrom, said passageways extending through the several cranks and opening at points to supply the lubricant to bearing contact surfaces between the cranks and the connecting rods.

5. The combination with a crank shaft of an engine having connecting rods trunnioned to the cranks of the shaft, of a ring shaped member encircling and supported by the shaft so as to be self centering with respect thereto when held against rotation with the shaft, said member having a groove in its shaft contacting surface, said crank shaft having passageways for conducting lubricant fluid under pressure from said groove and to the several bearing contact surfaces between the shaft cranks and the connecting rods, and means for conducting lubricant fluid to the said member groove.

6. The combination with a crank shaft of an engine having connecting rods trunnioned to the cranks of the shaft, of a ring shaped member encircling and supported by the shaft so as to be self centering with respect thereto when held against rotation with the shaft, said member having a groove in its shaft contacting surface, said crank shaft having passageways for conducting lubricant fluid under pressure from said groove and to the several bearing contact surfaces between the shaft cranks and the connecting rods, and a pipe connected to the ring shaped member for restraining the member from rotation with the shaft and for conducting lubricant fluid to the groove of the member.

7. The combination with a crank shaft of an engine having connecting rods trunnioned to the cranks of the shaft, of a ring shaped member encircling and supported by the shaft so as to be self centering with respect thereto when held against rotation with the shaft, said member having a groove in its shaft contacting surface, said crank shaft having passageways for conducting lubricant fluid under pressure from said groove and to the several bearing contact surfaces between the shaft cranks and the connecting rods, a lubricant chamber disposed laterally with respect to the shaft, and a pipe rigidly secured at one end in the ring and having its other end connected with said chamber.

8. The combination with a crank shaft of an engine having connecting rods trunnioned to the cranks of the shaft, of a ring shaped member encircling and supported by the shaft so as to be self-centering with respect thereto when held against rotation with the shaft, said member having a groove in its shaft contacting surface, said crank shaft having passageways for conducting lubricant fluid under pressure from said groove and to the several bearing contact surfaces between the shaft cranks and the connecting rods, a lubricant chamber disposed laterally with respect to the shaft, and a pipe rigidly secured at one end in the ring and having its other end adjustably secured to the chamber whereby the ring shaped member may move to provide freedom for said self centering action of the member with respect to the shaft.

9. The combination with the crank shaft of an engine, of a member encircling the shaft and for supplying lubricant fluid thereto, said member being primarily supported by the shaft and self centering with respect thereto when the shaft rotates within it, a lubricant supply chamber having an aperture opening therefrom, a pipe secured at one end to the member, restraining the same from rotation with the shaft, and having its other end projecting loosely through said aperture into the supply chamber to conduct lubricant therefrom to the ring, and means for preventing the escape of lubricant from the chamber out through the aperture about the pipe.

10. The combination with the crank shaft of an engine, of a member encircling the shaft and for supplying lubricant fluid thereto, said member being primarily supported by the shaft and self centering with respect thereto when the shaft rotates within it, a lubricant supply chamber having an aperture opening therefrom, a pipe secured at one end to the member, restraining the same from rotation with the shaft, and having its other end projecting loosely through said aperture into the supply chamber to conduct lubricant therefrom to the ring, and means for preventing the escape of lubricant from the chamber out through the aperture about the pipe, said means comprising a packing ring sufficiently yieldable to permit slight movements of the pipe in response to the self centering action of the shaft encircling member.

11. The combination with the crank shaft of an engine, of a member encircling the shaft and for supplying lubricant fluid thereto, said member being primarily supported by the shaft and self centering with respect thereto when the shaft rotates within it, a lubricant supply chamber having an aperture opening therefrom, a pipe secured at one end to the member, restraining the same from rotation with the shaft, and having its other end projecting loosely through said aperture into the supply chamber to conduct lubricant therefrom to the ring, and means for preventing the escape of lubricant from the chamber out through the aperture about the pipe, said means comprising a packing ring and a spring tending to compress the same to produce a resilient seal about the pipe.

WILLIAM E. SWENSON.